July 11, 1933.   J. E. MAYNARD   1,917,534
INFLATABLE BALL
Filed May 20, 1930
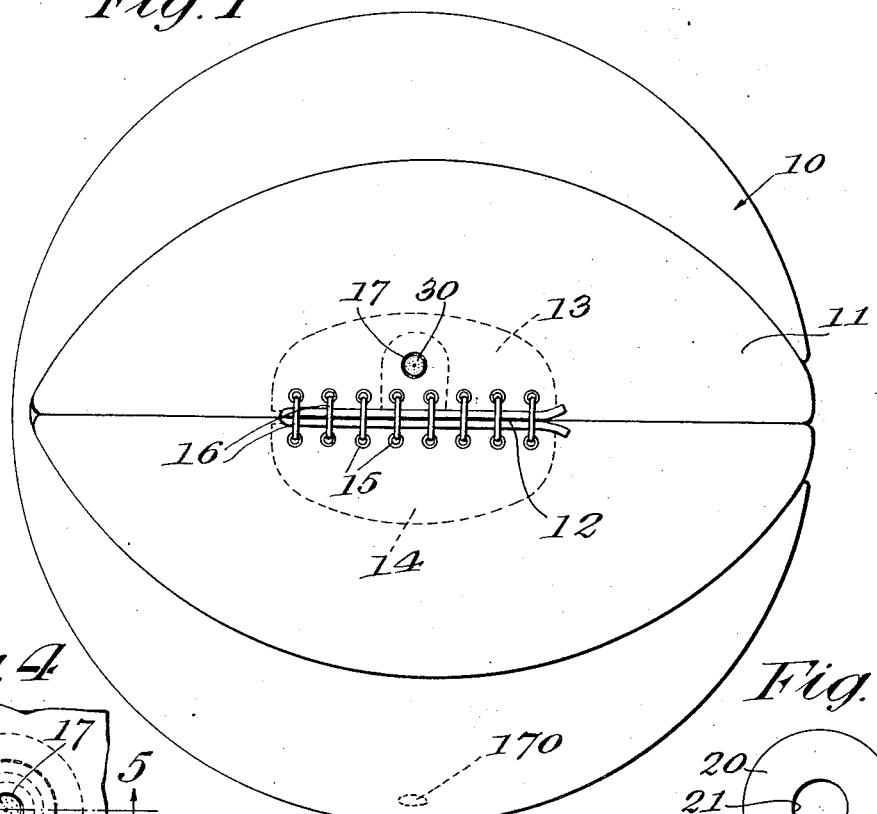
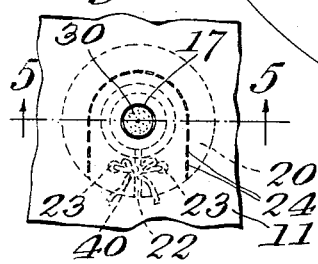
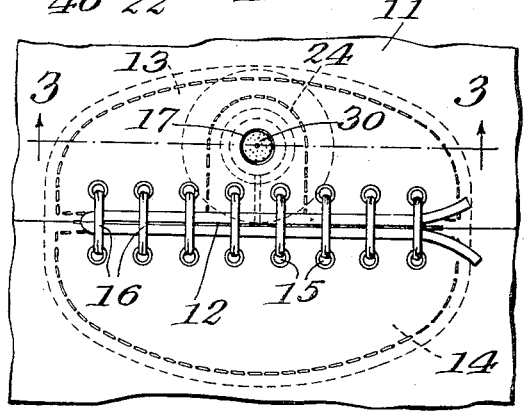
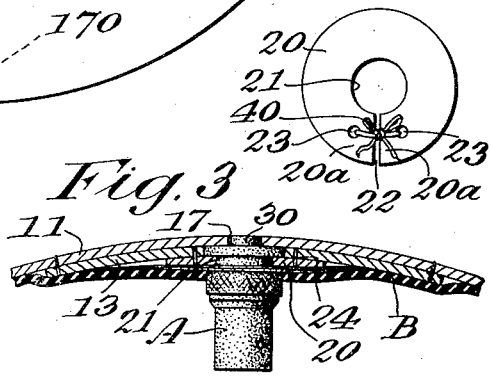
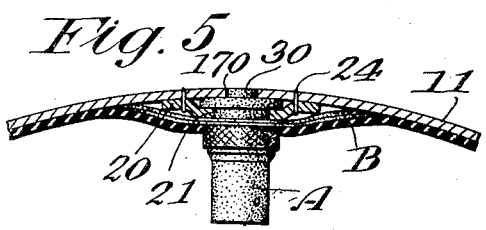
Inventor:
John E. Maynard
By Macleod, Calver, Copeland & Dike
Attorneys.

Patented July 11, 1933

1,917,534

UNITED STATES PATENT OFFICE

JOHN E. MAYNARD, OF PLYMOUTH, NEW HAMPSHIRE, ASSIGNOR TO THE DRAPER-MAYNARD COMPANY, OF PLYMOUTH, NEW HAMPSHIRE, A CORPORATION OF NEW HAMPSHIRE

INFLATABLE BALL

Application filed May 20, 1930. Serial No. 453,986.

This invention relates to inflatable balls of the type comprising a leather or other flexible cover, and an inflatable member or bladder positioned within the cover and adapted to be inflated or deflated through a hole or opening in the cover, and more particularly to means for detachably supporting the valve structure of the bladder in the cover.

One of the objects of the invention is to provide the cover of an inflatable ball or a part attached to the cover, with means for receiving and detachably supporting rubber, metal, or other valve structures of bladders; another object being to provide additional means which cooperates with the receiving and supporting means to maintain the valve structure in place against accidental displacement during use of the ball.

Other objects of the invention will appear in the following description and appended claims, reference being had to the accompanying drawing forming a part of this specification wherein like reference characters designate corresponding parts in the several views.

In said drawing:

Fig. 1 shows one type of inflatable ball to which the valve supporting device of my invention may be applied.

Fig. 2 is an enlarged fragmentary plan view showing one application of the valve attaching and supporting structure to the ball.

Fig. 3 is a section taken substantially along the line 3—3 of Fig. 2.

Fig. 4 is a fragmentary plan view of a modified form of the invention showing the device applied to a ball at a point remote from the bladder insertion opening.

Fig. 5 is a sectional view taken substantially along the line 5—5 of Fig. 4; and Fig. 6 is a detail plan view of one form of attaching device per se.

Before explaining in detail the present invention, and the method or mode of operation embodied therein, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

Referring now particularly to the drawing, it will be seen that I have illustrated several methods of using the bladder valve attaching and supporting device of my invention. In Fig. 1 the device is shown as applied to the ball cover or casing adjacent the bladder insertion opening, and in Figs. 4 and 5 the device is shown as applied to the ball cover at a point remote from the bladder insertion opening. A game ball is shown as a whole at 10 and comprises a cover 11 having the usual bladder insertion opening 12 therein and reinforcing stays 13 and 14 attached to the inside of the cover on opposite sides of the bladder insertion opening. The cover and stays are provided with a series of holes or eyelets 15 adapted to receive the usual lacing 16, to close the bladder insertion opening. The ball cover and one of the stays are provided with an aperture 17. When, however, it is desired to attach the valve of the bladder to the ball casing or cover at a point remote from the bladder insertion opening, a similar aperture may be provided in the ball cover at any desired location, such for example as at 170, shown in broken lines, Fig. 1.

The attaching device of my invention comprises, preferably, a disk-like tab or member which may be in the form of a ring 20 having a central aperture or recess 21 and a slot 22 between the adjacent ends of the ring communicating with the aperture. The ring is also provided with holes 23 adjacent the ends thereof, which holes, when the device is attached to one of the stays of the ball cover, register with certain of the holes or eyelets 15. The member 20 may be formed of any suitable material such as leather, fabric, or the like, and may be flexible, resilient, or relatively stiff, as desired. The member 20 may be attached to the casing in any suitable manner, such as by means of a row of stitching 24, as shown, or the member may be cemented to the inner wall of the cover. When the device is attached to the reinforcing stay 13, it preferably surrounds the aperture 17 so that its central aperture 21 registers with the aperture 17. I have shown my improved attaching means used in connection with a rubber valve A of an inflatable member or bladder B, but it will be understood that the device is capable of receiving and supporting metallic valves, or valves formed of any other desired material, with equal facility.

After the member 20 has been attached to the inner face of the stay 13 by means of the stitching 24, it will be seen that the ends 20a of the ring are free from the stay and are capable of being flexed upon the insertion of the valve member. The bladder is then inserted through the bladder insertion opening and the valve stem passed through the slot 22 until it engages the central aperture or recess 21, the parts assuming the positions in which they are best shown in Fig. 3, wherein it will be seen that the reduced end or post 30 of the valve member fits relatively snugly in the aperture 17 formed in the casing and is flush with the outside of the ball cover 11 to exclude dirt or mud. The lacing 16 is then inserted in the usual manner through the holes or eyelets 15 and is also passed through the holes 23 in the ring 20 thus maintaining the normally free ends 20a of the ring in contact with the inner surface of the stay 13 to hold the valve in position against accidental displacement.

In that form of the invention shown in Figs. 4 and 5, the ring 20 is attached to the inner face of the ball casing at any desired point remote from the bladder insertion opening by a row of stitching 24 as in the other form, or it may be attached to the casing by cementing, or in any other suitable manner. The bladder with its attached valve is then inserted through the bladder insertion opening 12 and the stem of the valve passed through the slot 22 until it engages the central recess or aperture 21. A separate lacing 40 may then be threaded through the holes 23 and tied to hold the valve stem in position in the recess 21 against accidental displacement. It is not necessary to use the lacing 40 but when it is not used it is preferable to provide the ring of relatively stiffer material so as to properly support the valve of the bladder. It will be understood that when the bladder is inflated, the frictional contact of it against the inner wall of the ball cover assists in maintaining the bladder in position against accidental displacement in use. The conventional lacing 16 is then threaded through the eyelets to close the opening 12. In this latter form of the invention it will be understood that the reduced end 30 of the valve member fits relatively snugly within the aperture 170 and is flush with the outer surface thereof to exclude dirt and mud.

From the foregoing it will be seen that I have provided a bladder supporting member capable of quick attachment to the ball casing and one which permits the valve of the bladder to be slipped into place and held therein against accidental displacement, without the necessity of using threaded stem and socket members, or other relatively complicated and expensive constructions, such as have been used heretofore with inflatable balls.

It is to be understood that the attaching member of my invention is not limited to use in connection with inflatable balls but may be attached to any body capable of being inflated and with which it is desired to use an inflatable member capable of being quickly attached to or detached from the body.

I claim:

1. An inflatable ball comprising a cover having a bladder insertion opening, reenforcing stays connected with the inner face of said cover at opposite sides of said bladder insertion opening, a bladder having a valve structure attached thereto, said cover and said stays having a row of holes at each side of the bladder insertion opening, a lace adapted to be inserted in said holes to close said bladder insertion opening, the cover and one of said stays also having an aperture therein spaced from said rows of holes, and a recessed disk attached to the inner face of one of said stays surrounding the aperture therein for receiving and removably supporting said valve structure, said disk having a slot leading into said recess through which said valve structure is inserted, said disk also being provided with holes adapted to register with certain of the holes in said stay and cover, whereby said lace may be threaded through said registering holes to maintain the valve structure in said recess against accidental displacement.

2. An inflatable ball comprising a cover having a bladder insertion opening and a lacing for closing said opening, reenforcing stays positioned at opposite sides of said bladder insertion opening on the inner wall of said cover, a bladder having a rubber valve located within said cover, a flat washer-like member having a key-hole slot therein provided with a contractible opening directly and permanently attached to one of said stays for receiving and detachably supporting said rubber valve, and means whereby said cover closing lacing closes the key-hole slot to prevent accidental displacement of said rubber valve.

In testimony whereof I affix my signature.

JOHN E. MAYNARD.